United States Patent [19]

Schuhmann et al.

[11] Patent Number: 5,571,613
[45] Date of Patent: Nov. 5, 1996

[54] BIAXIALLY ORIENTATED POLYPROPYLENE MULTILAYER FILM, PROCESS FOR ITS PRODUCTION, AND ITS USE

[75] Inventors: Detlef E. Schuhmann, Kiedrich; Thomas Dries, Schwabenheim; Adolf Wilheim, Wiesbaden; Dieter Scheidecker, Eltville; Harald Lohmann, Neunkirchen; Ursula Murschall, Nierstein; Herbert Peiffer, Mainz; Gunter Schloegl, Kelkheim, all of Germany

[73] Assignee: Hoechst Aktiengesellschaft, Frankfurt am Main, Germany

[21] Appl. No.: 531,306

[22] Filed: Sep. 20, 1995

Related U.S. Application Data

[62] Division of Ser. No. 186,144, Jan. 25, 1994, Pat. No. 5,501,901.

[30] Foreign Application Priority Data

Jan. 25, 1993 [DE] Germany .......................... 43 01 897.1
Jan. 25, 1993 [DE] Germany .......................... 43 01 896.3

[51] Int. Cl.⁶ .................................................. B32B 27/00
[52] U.S. Cl. ...................... 428/323; 428/327; 428/330; 428/336; 428/347; 428/349; 428/500; 428/515; 428/516; 428/523; 428/213
[58] Field of Search ................................... 428/323, 500, 428/515, 516, 523, 327, 336, 347, 349, 213, 330

[56] References Cited

U.S. PATENT DOCUMENTS

| | | | |
|---|---|---|---|
| 4,329,399 | 5/1982 | Swerlick | 428/422 |
| 4,348,457 | 9/1982 | Rosenthal et al. | 428/349 |
| 4,375,989 | 3/1983 | Makinen | 106/300 |
| 4,400,428 | 8/1983 | Rosenthal et al. | 428/349 |
| 4,447,271 | 5/1984 | Howard et al. | 106/300 |
| 4,618,527 | 10/1986 | Doyen | 428/213 |
| 4,659,612 | 4/1987 | Balloni et al. | 428/516 |
| 4,698,261 | 10/1987 | Bothe et al. | 428/204 |
| 4,769,418 | 9/1988 | Mizuno et al. | 525/106 |
| 4,842,187 | 6/1989 | Janocha et al. | 229/87 |
| 5,026,592 | 6/1991 | Janocha et al. | 428/204 |
| 5,028,480 | 7/1991 | Dean | 428/314.4 |
| 5,077,129 | 12/1991 | Schinkel et al. | 428/402 |
| 5,254,394 | 10/1993 | Bothe et al. | 428/212 |
| 5,277,970 | 1/1994 | Schuhmann et al. | 428/323 |
| 5,302,427 | 4/1994 | Murschall et al. | 428/34.2 |
| 5,306,559 | 4/1994 | Christopherson | 428/349 |
| 5,326,625 | 7/1994 | Schuhmann et al. | 428/215 |
| 5,376,437 | 12/1994 | Kawakami et al. | 428/216 |
| 5,419,960 | 5/1995 | Touhsaent | 428/331 |
| 5,466,520 | 11/1995 | Krallmann et al. | 428/323 |

FOREIGN PATENT DOCUMENTS 0408971 1/1991 European Pat. Off. .
0463517 1/1992 European Pat. Off. .

OTHER PUBLICATIONS

Ullmann's Encyclopedia of Industrial Chemistry, 4th edition, vol. 12, pp. 525–555.

*Primary Examiner*—Patrick Ryan
*Assistant Examiner*—Marie R. Yamnitzky
*Attorney, Agent, or Firm*—Foley & Lardner

[57] ABSTRACT

A coextruded, biaxially orientated film comprising a base layer, which comprises a polypropylene or a polypropylene mixture, and at least one top layer comprising olefinic polymers. The top layer comprises a combination of inorganic and/or organic particles and tertiary aliphatic amine of the formula I

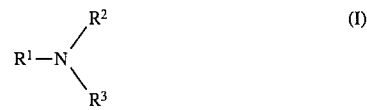

in which
  $R^1$ essentially is an at least partially unsaturated alkyl radical having at least 18 carbon atoms or an essentially completely saturated alkyl radical having 8 to 26 carbon atoms and
  $R^2$ and $R^3$ are identical or different and are $R^4$-$CH_2OH$, in which $R^4$ is an essentially saturated $C_{1-C_6}$-alkyl radical.
The film is useful, for example, as a label or wrapping.

20 Claims, No Drawings

BIAXIALLY ORIENTATED POLYPROPYLENE MULTILAYER FILM, PROCESS FOR ITS PRODUCTION, AND ITS USE

This application is a divisional of application Ser. No. 08/186,144 filed Jan. 25, 1994(now U.S. Pat. No. 5,501, 901).

BACKGROUND OF THE INVENTION

1. Field of the Invention

The invention relates to coextruded, biaxially orientated films comprising a base layer, which comprises a polypropylene polymer or a mixture of polypropylene polymers, and at least one top layer comprising olefin polymers.

The invention furthermore relates to processes for the production of the film and to various uses of the film.

2. Description of Related Art

The films known from the prior art have the disadvantage that they have poor antistatic properties and have very poor destacking properties. In addition to their customary use as packaging film, films are also used as labeling material. For this, the film is cut into sections of suitable size, which are stacked on top of one another. During the labeling process, the individual cut section of film is removed mechanically from this stack and passed to the labeling process. Problems often occur with conventional films during this mechanical de-stacking operation when the machine frequently grips more than one sheet.

Furthermore, the conventional films have poor antistatic properties, which on the one hand leads to contamination of the surface due to accumulations of dust, but also, because of the large surface area of the film, represents a source of danger in the event of extreme charging, for example by sudden discharging in a printer, which may even lead to explosions of solvents.

The treatment, known in the prior art, of the base layer with antistatic agents improves the antistatic properties of the films insufficiently. Incorporation of corresponding additives into the top layer leads to problems due to evaporation during the production process. These films are not yet sufficiently antistatic either.

Opaque films are generally known. For example, EP-A-0 180 087 describes a five-layered sealable film which has a vacuole-containing base layer produced from propylene homopolymer and calcium carbonate, and an intermediate layer of propylene homopolymer and hydrocarbon resin, the sealable top layers of which film comprise propylene/ethylene copolymers. Because of the thick intermediate layer of polypropylene and hydrocarbon resin, the film has better mechanical properties and a higher gloss than films according to the prior art. In addition, the film can easily be corona-treated because of the sealing layers of propylene/ ethylene copolymers. The film, however, is in need of improvement in respect of its antistatic properties and its destacking properties.

EP-A-0 312 226 discloses a multilayer opaque film in which a top layer comprises a readily printable polymer and which has an intermediate layer of propylene homopolymers and a core layer which contains vacuoles. The film is said to be distinguished by a good gloss when viewed from the homopolymer side. Because of the stated ratios in layer thickness, the surface gloss and the opacity or whiteness are in need of improvement.

EP-A-0 408 971 describes a film of high whiteness and high opacity, which is readily printable and is said to be glossy. The film has a cloudy structure, which probably originates from the small particle size of the calcium carbonate used. The particle size of 1.0 μm stated as preferred results in a poor dispersability in the polymer. Furthermore, the increased fine content of the particles leads to a reduced opacity, since no vacuoles are thereby formed.

EP-A-0 234 758 and EP-A-0 225 685 describe readily printable opaque films. Because of the nature of the surface, however, the films are distinguished by a very matte appearance.

SUMMARY OF THE INVENTION

An object of the present invention was to avoid the disadvantages of the films already described in the prior art. In particular, a multilayer film which is distinguished by very good destacking properties and outstanding antistatic properties is to be provided. At the same time, the film should have a high gloss and at least one top layer having good sealing properties, in particular with a wide sealing range and a good sealed seam strength.

For opaque embodiments of the film, an outstanding opacity is desirable, and for economic reasons, this opaque film should offer a high yield per unit area and be inexpensive to produce.

It is also an object of the present invention to provide methods of making films having these desired properties and to provide methods of using such film, for example, as labels and/or wrappings.

In accomplishing the foregoing objectives, there has been provided, in accordance with one aspect of the present invention a coextruded, biaxially oriented film comprising a base layer, which comprises a propylene polymer and at least one top layer comprising an olefinic polymer, wherein the top layer comprises inorganic or organic particles and tertiary aliphatic amine of the formula I

in which
$R^1$ is an at least partially unsaturated alkyl radical having at least 18 carbon atoms or an essentially saturated alkyl radical having 8 to 26 carbon atoms and
$R^2$ and $R^3$ are identical or different and are $R^4\text{-CH}_2\text{OH}$, in which $R^4$ is an essentially saturated $C_1$–$C_6$-alkyl radical.

In accordance with another aspect of the present invention, there has been provided a sealable, coextruded, biaxially oriented opaque film comprising a base layer which comprises a propylene polymer and filler, and at least one sealable top layer, wherein the top layer comprises inorganic or organic particles and tertiary aliphatic amine of the formula I

in which
$R^1$ is an at least partially unsaturated alkyl radical having at least 18 carbon atoms or an essentially saturated alkyl radical having 8 to 26 carbon atoms and
$R^2$ and $R^3$ are identical or different and are $R^4\text{-CH}_2\text{OH}$, in which $R^4$ is an essentially saturated $C_1$–$C_6$-alkylene radical.

In accordance with a further aspect of the present invention, there has been provided a process for the production of the above films, wherein the melts corresponding to the individual layers of the film are coextruded through a flat dye, the film thus obtained is cooled for solidification, the film is stretched biaxially and heat-set and, optionally, one or both surfaces is treated by corona or polarized flame.

Further objects, features, and advantages of the present invention will become apparent from the detailed description of preferred embodiments that follows.

DETAILED DESCRIPTION OF PREFERRED EMBODIMENTS

The core layer of the multilayer film according to the invention essentially comprises a propylene polymer or a mixture of propylene polymers. Essentially means that the core layer generally contains at least 50%, more preferably at least 75% by weight of propylene polymers.

Any desired propylene polymer known in the art can be used in the core layer. Generally, the propylene polymer comprises at least 50%, preferably at least 90% by weight propylene and generally has a melting point of 140° C. or higher, preferably 150 to 170° C. Isotactic homopolypropylene having an n-heptane-soluble content of 6% by weight or less, based on the isotactic homopolypropylene, copolymers of ethylene and propylene having an ethylene content of 10% by weight or less and copolymers of propylene with $C_4$–$C_8$-$\alpha$-olefins having an $\alpha$-olefin content of 10% by weight or less are preferred propylene polymers of the core layer, isotactic homopolypropylene being particularly preferred. The percentages by weight stated relate to the particular copolymer.

The propylene polymers of the core layer in general have a melt flow index of 0.5 g/10 min to 8 g/10 min, preferably 2 g/10 min to 5 g/10 mins, at 230° C. under a force of 21.6 N (DIN 53 735).

Furthermore, a mixture of propylene homo- and/or copolymers such as those mentioned above, and other polyolefins, in particular those from olefins having 2 to 6 carbon atoms, is suitable for use as the base layer. The mixture generally contains at least 50% by weight, in particular at least 75% by weight, of propylene polymers. Other suitable polyolefins in the polymer mixture include any known polyolefin, such as polyethylenes, in particular HDPE, LDPE and LLDPE, the content of these polyethylenes in each case generally not exceeding 15% by weight, based on the polymer mixture.

If appropriate, the polypropylene polymer employed in the core layer can be partly degraded by addition of organic peroxides. The so-called degradation factor A, which indicates the relative change in melt flow index according to DIN 53 735 of the polypropylene, based on the starting polymer, is a measure of the degree of degradation of the polymer and is defined as follows:

$$A = \frac{MFI_1}{MFI_2}$$

$MFI_1$ = Melt flow index of the polypropylene polymer before addition of the organic peroxide $MF_2$ = Melt flow index of the peroxidically degraded polypropylene polymer In general, the degradation factor A of the polypropylene polymer employed is in a range of from 3 to 15, preferably 6 to 10.

Any peroxide can be used for the degradation. Particularly preferred organic peroxides include dialkyl peroxides, an alkyl radical being understood as meaning the customary saturated straight-chain or branched lower alkyl radicals having up to six carbon atoms. 2,5-Di- methyl-2,5-di(t-butylperoxy)hexane or di-t-butyl peroxide are particularly preferred.

If the film is desired to be opaque, the film generally comprise fillers in the base layer in an amount effective to give an opaque film, generally in an amount of 3 to 20% by weight, based on the base layer so as to give the desired opaqueness.

These fillers are the customary inorganic and/or organic materials which are incompatible with polypropylene. Inorganic fillers are preferred. Particularly suitable fillers include aluminum oxide, aluminum sulfate, barium sulfate, calcium carbonate, magnesium carbonate, silicates, such as aluminum silicate (kaolin clay) and magnesium silicate (talc), silicon dioxide and/or titanium dioxide, among which calcium carbonate, silicon dioxide, titanium dioxide or mixtures thereof are preferably employed. Calcium carbonate (chalk) is particularly preferred.

Possible organic fillers are the polymers which are usually used in opaque films and are incompatible with the polymer of the base layer, in particular polymers such as polyesters, polystyrenes, polyamides and halogenated organic polymers, with polyesters such as, for example, polybutylene terephthalates being preferred.

According to the invention, the amount of filler in the base layer is chosen to make the film opaque. This content is generally 3–20% or 5–20% of filler based on the total weight of the film. In particular the amount of $CaCO_3$ is generally 3 to 20% by weight, preferably 10 to 15% by weight, based on the total weight of the film. The average particle size, in particular that of $CaCO_3$, is generally in the range of from 1 to 5 µm, preferably in the range of from 1.5 to 4 µm.

It has been found that a film density of less than 0.7 g/cm³ can be achieved even with a relatively low filler content of 5 to 20%, preferably 9 to 13% by weight based on the total weight of the film. In general, the density of the film according to the invention is in the desirable range of from 0.4 to 0.6 g/cm³.

In addition to the preferred calcium carbonate, titanium dioxide is a further suitable core layer additive which may be employed in the core layer, if appropriate, in combination with $CaCO_3$. In a preferred embodiment, the titanium dioxide particles comprise rutile to the extent of at least 95% by weight. The titanium dioxide particles are preferably employed with a coating of inorganic oxides, such as is usually used as a coating for $TiO_2$ white pigment in paper or paints for improving light-fastness. Particularly suitable inorganic oxides include the oxides of aluminum, silicon, zinc or magnesium, or mixtures of two or more of these compounds. They are precipitated in the aqueous suspension from water-soluble compounds, for example alkali metal aluminate, in particular sodium aluminate, aluminum hydroxide, aluminum sulfate, aluminum nitrate, sodium silicate or silicic acid. $TiO_2$ particles with useful coatings are described, for example, in EP-A-0 078 633 and EP-A-0 044 515, which are both hereby incorporated by reference.

If appropriate, the coating for the titanium dioxide also comprises organic compounds having polar and non-polar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or Polyorganohydrosiloxanes, such as polydimethylsiloxane and polymethylhydridosiloxane.

The coating on the $TiO_2$ particles usually comprises 1 to 12 g, in particular 2 to 6 g, of inorganic oxides, and if appropriate additionally comprises 0.5 to 3 g, in particular 0.7 to 1.5 g, of organic compounds, per 100 g of TiO$_2$ particles. The coatings may be applied in any suitable manner and are preferably applied to the particles in aqueous suspension. It has proven to be particularly advantageous if the TiO$_2$ particles are coated with Al$_2$O$_3$ or with Al$_2$O$_3$ and polydimethylsiloxane.

The content of titanium dioxide in the core layer—if present—is generally 1 to 9% by weight, preferably 3 to 5% by weight, based on the total weight of the film. The average particle size is very small and is preferably 0.15 to 0.30 μm, the particle size stated relating to the coated particles.

TiO$_2$ is preferably used in addition to CaCO$_3$ in the base layer if a white opaque appearance of the film is desired. Films having a base layer containing only filler usually have a cloudy, so-called opaque appearance which is formed by scattering processes at the vacuoles of the base layer. A white appearance which is achieved by coloration by pigments, preferably TiO$_2$, is to be distinguished from this.

If appropriate, the core layer furthermore comprises a low molecular weight resin, the content of which is generally 1 to 30% by weight, preferably 2 to 10% by weight. The softening point of the resin is generally between 130° and 180° C. (measured in accordance with DIN 1995-U4, corresponds to ASTM E-28), preferably between 140° and 160° C. Among the numerous low molecular weight resins, the hydrocarbon resins are preferred, and in particular in the form of the petroleum resins, styrene resins, cyclopentadiene resins and terpene resins. These resins are described, for example, in Ullmanns Encyklopädie der techn. Chemie (Ullmann's Encyclopedia of Industrial Chemistry), 4th edition, volume 12, pages 525 to 555. Suitable petroleum resins are described in numerous specifications, such as, for example, EP-A-0 180 087, which is hereby incorporated by reference.

The top layer of the multilayer film according to the invention comprises at least one olefinic polymer and a combination of inorganic and/or organic particles and tertiary aliphatic amine of the formula I:

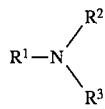

(I)

in which
R$^1$ is an at least partially unsaturated alkyl radical having at least 18 carbon atoms or an essentially saturated alkyl radical having 8 to 26 carbon atoms and
R$^2$ and R$^3$ are identical or different and are R$^4$-CH$_2$OH, in which R$^4$is an essentially saturated C$_1$–C$_6$-alkylene radical.

At least partially means that the degree of saturation is less than 10% so as to be distinct from the "essentially saturated alkyl radicals."

Any olefinic polymer can be used in the top layer. The olefinic polymer is generally sealable. Sealable olefinic polymers in the context of the present invention include any sealable polymer, formed from olefins. Particularly useful polymers include:

copolymers of
ethylene and propylene or
ethylene and butylene or
propylene and butylene or
ethylene and another α-olefin having 5 to 10 carbon atoms or
propylene and another α-olefin having 5 to 10 carbon atoms or
terpolymers of
ethylene and propylene and butylene or
ethylene and propylene and another α-olefin having 5 to 10 carbon atoms or
a mixture of two or more of the co- and/or ter-polymers mentioned.

The top layer(s) particularly preferably contain(s)
a copolymer of
ethylene and propylene or
ethylene and 1-butylene or
propylene and 1-butylene or
a terpolymer of
ethylene and propylene and 1-butylene or
a mixture of two or more of the particularly preferred co- and/or terpolymers mentioned,
particularly preferred polymers being
random ethylene/propylene copolymers having
an ethylene content of 2 to 10% by weight,
preferably 5 to 8% by weight, or
random propylene/1-butylene copolymers having
a butylene content of 4 to 25% by weight,
preferably 10 to 20% by weight,
in each case based on the total weight of the copolymer, or
random ethylene/propylene/1-butylene terpolymers having
an ethylene content of 1 to 10% by weight,
preferably 2 to 6% by weight, and
a 1-butylene content of 3 to 20% by weight,
preferably 8 to 10% by weight,
based on the total weight of the terpolymer, or
a mixture of an ethylene/propylene/1-butylene ter-polymer and a propylene/1-butylene copolymer
having an ethylene content of 0.1 to 7% by weight
and a propylene content of 50 to 90% by weight,
and a 1-butylene content of 10 to 40% by weight,
based on the total weight of the polymer mixture.

The copolymers described above which are employed in the top layer in general have a melt flow index of 1.5 to 30 g/10 min, preferably 3 to 15 g/10 mins. The melting point is generally in the range of from 120° to 140° C. The terpolymers employed in the top layer generally have a melt flow index in the range of from 1.5 to 30 g/10 mins, preferably 3 to 15 g/10 min, and a melting point generally in the range of from 120° to 140° C. The blend of co- and terpolymers which is described above generally has a melt flow index of 5 to 9 g/10 min and a melting point of 120° to 150° C. All the abovementioned melt flow indices are measured at 230° C. under a force of 21.6 N (DIN 53 735).

The top layer polymers described above can also be peroxidically degraded in a manner analogous to that described above for the base layer. The same peroxides as described above are in principle used here for the degradation. The degradation factor A of the top layer polymer(s) is in general in the range of from 3 to 15, preferably 5 to 10.

Those homopolymers which have been described above for the base layer can in principle also be used as olefinic polymers for the top layer. Sealable homopolymers can in principle also be used as polymers for the top layer. These sealable homopolymers are distinguished by a particular structure and completely novel properties compared with the conventional known isotactic, non-sealable homopolymers. Such materials are described in DE-A-42 28 812 and EP-A-0 484 816 which are both hereby incorporated by reference.

It has been found, surprisingly, that top layers which comprise a selected aliphatic amine of the formula I in association with inorganic and/or organic particles have outstanding antistatic properties and very good de-stacking properties. The amine and particles are used in amounts effective to obtain these outstanding properties. The amount of amine is generally 0.05 to 2% based on the weight of the top layer, preferably 0.1 to 1%.

Tertiary aliphatic amines are known per se from the prior art. Surprisingly, however, only the amines which have the specific structure given by the formula I interact in the desired manner with the inorganic/organic particles of the top layer.

It has been found that the customary use of customary tertiary aliphatic amines as antistatic agents in the base layer does not bring the desired antistatic properties to the required extent. The use of conventional antistatic agents in the top layer leads to problems during the production process, since the amine is deposited to a considerable degree on the rolls and evaporates in the transverse stretching frame, and only a fraction of the amount originally employed is found in the film. The antistatic properties are thus inadequate.

Surprisingly, the present inventors have found that these problems do not arise when the selected amines according to formula I are used. In spite of incorporation of the additive into the top layer, no evaporation in the transverse stretching frame or deposits on the rolls occur. The concentration of the amine in the top layer corresponds to the amount initially employed.

Preferred tertiary aliphatic amines of the formula I are those in which $R^1$ is a $C_{18}$–$C_{30}$-, preferably $C_{18}$–$C_{26}$- alkyl radical which are at least partially unsaturated or an essentially hydrogenated $C_8$–$C_{26}$, preferably $C_{12}$–$C_{18}$-alkyl radical and $R^2$ and $R^3$ are identical or different and are $R^4$-$CH_2OH$, in which $R^4$ is an essentially saturated $C_1$–$C_6$, preferably $C_1$-$C_3$-alkylene radical.

Alkyl radicals are understood as meaning straight-chain or branched hydrocarbon radicals. Alkylene is a straight or branched bridging hydrocarbon chain.

"Essentially" in the contex of the tertiary amine of the present invention means that, in addition to the meaning given for the radical $R^1$, small amounts, i.e., less than 10%, based on the total amount of amine, of other chain lengths, including in particular shorter chain lengths, can also be present; i.e., a chain length distribution of the alkyl radicals of the individual substituents exists in a certain amount of tertiary aliphatic amine such that, for example, in addition to alkyl radicals for $R^1$, small amounts of $C_{16}$ or $C_{14}$ can also be found for $R^1$.

"Essentially saturated" or "essentially hydrogenated" in the context of the present invention means that the degree of saturation of the alkyl radicals is at least 90% preferably more than 95%.

Tertiary aliphatic amines of the formula I which have proved to be very especially effective for the present invention are those in which $R^1$ is $C_{18}$–$C_{20}$- at least partially unsaturated alkyl, preferably at least partially unsaturated $C_{18}$-alkyl, $R^2$ and $R^3$ essentially are $CH_{2-CH_2}OH$, and those amines of the formula I in which $R^1$ 55 to 65% $C_{18}$-alkyl 30 to 40% $C_{16}$-alkyl 0 to 5% $C_{14}$-alkyl 0 to 1% $C_{12}$-alkyl all the alkyl radicals essentially being saturated, and in which $R^2$ and $R^3$ are $CH_2$–$CH_2OH$.

It is essential to the invention that the top layer(s) furthermore contain(s) inorganic and/or organic particles in association with the tertiary aliphatic amine(s).

Particles in the context of the invention are understood as meaning particles which are incompatible with the ofelinic polymers of the top layer and are present as separate particles in the film, regardless of the film production process.

Inorganic particles are understood as meaning the customary inorganic-particles which are incompatible with polypropylene. Inorganic fillers are preferred, and particularly suitable fillers are aluminum oxide, aluminum sulfate, barium sulfate, calcium carbonate, magnesium carbonate, silicates, such as aluminum silicate (kaolin clay) and magnesium silicate (talc), silicon dioxide and/or titanium dioxide, among which calcium carbonate, silicon dioxide, titanium dioxide or mixtures thereof are preferably employed. Preferred inorganic particles are $CaCO_3$, $SiO_2$, $TiO_2$ or mixtures of these particles. Organic materials are also suitable as particles for the top layer.

In transparent embodiments of the films, the top layer(s) in general contain(s) 0.1 to 2% by weight, based on the weight of the top layer, of inorganic and/or organic particles. A particle content of the top layer of 0.2 to 1% by weight is preferred for transparent films. The average particle size is generally between 1 and 6 μm, in particular 2 to 5 μm or 2 to 4 μm, particles having a spherical shape being preferred.

In opaque embodiments of the film, the top layer(s) in general contain(s) 2 to 8% by weight, based on the weight of the top layer, of inorganic and/or organic particles. A particle content of the top layer of 4 to 6% by weight is preferred. The average particle size is generally between 1 and 6 μm, preferably 2 to 5 μm or 2 to 4 μm, particles having a spherical shape being preferred.

In a very especially advantageous opaque embodiment of the invention, the base and top layer comprise the same additives, preferably $CaCO_3$ and/or $TiO_2$. This allows problem-free recycling of film scrap obtained during production to the production process. Organic materials such as are described above as organic fillers for the base layer are also possible particles for the top layer. The particle content of the top layer and the filler content of the base layer results in a preferable total content of fillers and particles of 5 to 25% by weight, based on the total weight of the film. The opaque multilayer film preferably comprises 10 to 15% by weight of filler, based on the total weight of the film.

By combination of the selected tertiary aliphatic amine with particles for the top layer, it has been possible, surprisingly, to considerably improve the destacking properties and the antistatic properties of the film. These functions play an important role during use of the film according to the invention as a label or in mold labelling.

Surprisingly, the optical appearance of the film is not impaired by modifying the top layer with the additives mentioned, i.e., in spite of the fillers contained there, the film has outstanding gloss values. The film unexpectedly has very good sealing properties, in spite of the relatively high content of particles in the top layer. This is particularly surprising, since it is known that addition of $CaCO_3$ to the base layer leads to the formation of vacuoles during the stretching process, i.e., the structure of the polymer matrix is changed considerably. However, it has been found that the sealability of the film is unexpectedly good, in spite of a top layer containing filler.

Surprisingly, it has been found that, in spite of the filler incorporated into the top layer, the film does not display the "chalking" known to occur from non-coated opaque films. It is known that single-layer films which comprise comparable amounts of, for example, $CaCO_3$ display a white layer of dust in time. In particular, if the $CaCO_3$-containing layer is not coated, this dust forms from the film by $CaCO_3$ which has separated out. This process is in general called "chalking". Rolls, for example during production or processing of the film, also become contaminated by this separating out. It was completely unexpected that no problems occur in this respect in the film according to the invention.

To improve the adhesive properties of the top layer(s), the surfaces of the film can be corona- or flame-treated, corresponding treatment of one surface being sufficient, where appropriate. In particular, it is preferable for only one top layer to be corona- or flame-treated.

The film according to the invention is at least two-layered and always comprises, as essential layers, the core layer K and at least one top layer D with the additive combination according to the invention. The choice of the number of layers depends on the proposed intended use, three-layer embodiments being particularly preferred.

The overall thickness of the film can vary within wide limits and depends on the intended use. Preferred embodiments of the film according to the invention have overall thicknesses of 10 to 120 μm, more preferable 30 to 100 μm, in particular 40 to 100 μm, being more preferred.

The multilayer film has at least one top layer, preferably top layers on both sides. Top layers applied to both sides can be identical or different in their structure, their composition and their thickness.

The top layer(s) in general has/have a thickness of 0.5 to 5 μm, preferably 0.5 to 3μm or 0.5 to 2μm. Top layer thicknesses in the range of from 0.7 to 1.5 μm are particularly advantageous.

The thickness of the base layer is 8 to 120 μm, and opaque embodiments are preferably 20 to 100 μm thick.

In order to improve certain properties of the polypropylene film according to the invention still further, the core layer and the top layer(s) can comprise, in addition to the additive combination described, which is essential to the invention, further additives which do not impair the essential film properties, in each case in the effective amount, preferably lubricant and/or stabilizers and/or neutralizing agents which are compatible with the polymers of the core layer and the top layer(s). All the amounts data in percent by weight (% wt. ) in the following statements in each case relate to the layer or layers to which the additive can be added.

Any suitable lubricants may be employed in effective amounts. Useful lubricants include higher aliphatic acid amides, higher aliphatic acid esters, waxes and metal soaps, as well as polydimethylsiloxanes. The effective amount of lubricant is generally in the range of from 0.1 to 3% by weight. The addition of higher aliphatic acid amides in the range of from 0.15 to 0.25% by weight in the base layer and/or the top layers is particularly suitable. A particularly suitable aliphatic acid amide is erucic acid amide.

Addition of polydimethylsiloxanes in the range of from 0.3 to 2.0% by weight is also a preferred lubricant, in particular polydimethylsiloxanes having a viscosity of 10,000 to 1,000,000 $mm^2/s$.

Stabilizers which can be employed are the customary stabilizing compounds for ethylene polymers, propylene polymers and other α-olefin polymers. The amount thereof added is generally between 0.05 and 2% by weight. Phenolic stabilizers, alkali metal/alkaline earth metal stearates and/or alkali metal/alkaline earth metal carbonates are particularly suitable.

Phenolic stabilizers are preferred in an amount of 0.1 to 0.6% by weight, in particular 0.15 to 0.3% by weight, and with a molecular weight of more than 500 g/mol. Pentaerythrityl tetrakis-3-(3,5-di-tert-butyl-4- hydroxyphenyl)-propionate or 1,3,5-trimethyl-2,4,6tris(3,5-di-tert-butyl-4-hydroxybenzyl)benzene are particularly advantageous.

Any useful neutralizing agents can be used in neutralizing effective amounts. Neutralizing agents are preferably calcium stearate and/or calcium carbonate having an average particle size of not more than 0.7 μm, an absolute particle size of less than 10 μm and a specific surface area of at least 40 $m^2/g$.

The invention furthermore relates to a process for the production of the multilayer film. Any desired procedure can be used, but according to the invention, the coextrusion process, which is known per se, is preferred. In the context of this process, a procedure is followed in which the melts corresponding to the individual layers of the film are coextruded through a flat dye, the film thus obtained is taken off on one or more rolls for solidification, the film is then stretched (orientated) biaxially, and the biaxially stretched film is heat-set and, if appropriate, corona-treated on the surface layer intended for corona treatment.

The biaxial stretching (orientation) is in general carried out successively, successive biaxial stretching in which stretching is effected first longitudinally (in the machine direction) and then transversely (perpendicular to the machine direction) being preferred.

As is customary in the coextrusion process, the polymer or the polymer mixture of the individual layers is first compressed and liquefied in an extruder, it being possible for the polymer already to contain the additives which are added if appropriate. The melts are then forced simultaneously through a flat dye (slot dye), and the extruded multilayer film is taken off on one or more take-off rolls, during which process it cools and solidifies.

The film thus obtained is then stretched longitudinally and transversely to the extrusion direction, which leads to orientation of the molecular chains. Stretching is effected in a ratio of preferably 4:1 to 7:1 in the longitudinal direction and preferably 6:1 to 11:1 in the transverse direction. Longitudinal stretching is expediently carried out with the aid of two rolls running at different speeds corresponding to the desired stretching ratio and transverse stretching is carried out with the aid of a corresponding tenter frame.

Biaxial stretching of the film is followed by its heat-setting (heat treatment), the film being generally kept at a temperature of 120° to 170° C., preferably 140° to 160° C., for about 0.5 to 10 seconds. The film is then wound up in the customary manner using a winding device.

It has proved particularly favorable for the take-off roll or rolls by means of which the extruded film is also cooled and solidified, to be kept at a temperature of 10° to 90° C., preferably 20° to 60° C.

Furthermore, the longitudinal stretching is advantageously carried out at a temperature of less than 150° C., preferably in the range of from 110° to 140° C., and the transverse stretching is carried out at a temperature above 140° C., preferably at 145° to 180° C. The film is brought to the necessary stretching temperature by means of a hot air box.

If appropriate, as mentioned above, one or both surfaces of the film can be corona- or flame-treated by one of the known methods after the biaxial stretching.

Corona treatment is carried out such that the film is passed between two conductor elements serving as electrodes, such a high voltage, usually an alternating voltage (about 10,000 V and 10,000 Hz), being applied between the electrodes that spray or corona discharges can take place. The air above the surface of the film is ionized by the spray or corona discharge and reacts with the molecules of the film surface, so that polar inclusions are formed in the essentially non-polar polymer matrix. The treatment intensities are in the customary limits, 38 to 45 mN/m being preferred.

In flame treatment, the film is passed over a cooling roll, above which a gas burner is positioned. The film is pressed fully onto the cooling roll by a nip roll. The gas flowing out of the burner is ignited and forms flames about 5 to 10 mm in size. The oxidizing part of the flame makes contact with the surface of the film and ensures an increase in the surface energy of the film. This is also within the customary limit here.

The multilayer film according to the invention has a combination of properties which renders it particularly highly suitable for its intended use, as specified, as a labeling film or as a wrapping film for high-speed wrapping machines. It is distinguished by outstanding de-stacking properties and has all the properties required of polypropylene packaging films in respect of their optical appearance.

In summary, it can be said that the multilayer film according to the invention is distinguished by a number of advantageous properties, in particular by outstanding de-stacking properties excellent antistatic properties, a high gloss, a homogeneous film appearance, good sealing properties on one or both sides, good surface treatability, good immediate and long-term printability, a high scratch resistance of both surface layers, no chalking of top layer containing filler.

The invention is illustrated in more detail by the following examples:

EXAMPLE 1

A three-layer symmetric film (structure of the layers: DKD) was produced, the following production parameters being observed:
Extrusion temperature Core layer K 265° C.

Top layers D 265° C.

A three-layer preliminary film having a symmetric layer structure DKD was extruded by means of a three-layer dye. This preliminary film was cooled on a cooling roll (temperature of the cooling roll: 30° C.). It was then stretched first in the longitudinal ($\lambda_1$=5.5:1; T=130° C.) and then in the transverse direction ($\lambda_q$=9:1; T=160° C., convergence: 15%). The machine speed was about 210 m/min.

The film had the following structure:
Core layer K:
  87.88% by weight of propylene homopolymer having a melt flow index of 4 g/10 min (230° C., 21.6 N)
  12% by weight of calcium carbonate having an average particle diameter of 3.5 μm
  0.12% by weight of N,N-bis-ethoxyalkylamine (antistatic agent: Armostat®300, AKZO, Düren, DE) The calcium carbonate was employed by a masterbatch (30% by weight of PP, 70% by weight of $CaCO_3$; ®Multibase 7012 A, OMYA, Cologne, DE).
Top layers D:
  94.5% by weight of ethylene/propylene copolymer having a $C_2$ content of 4%, a melt flow index of 12 g/10 min (230° C., 21.6 N) and a degradation factor of 8
  5% by weight of calcium carbonate having an average particle diameter of 3.5 μm
  0.5% by weight of N,N-bis-ethoxyalkylamine (N,N-bis(hydroxyethylalkylamine) (®Armostat 600) of the formula I

in which
$R^1$ is 55 to 65% $C_{18}H_{35}$ 30 to 40% $C_{16}H_{31}$ 0 to 5% $C_{14}H_{27}$ and 0 to 1% $C_{12}H_{23}$, all the alkyl radicals being essentially completely saturated.
and in which
$R^2$ is $CH_2$-$CH_2OH$ and
$R^3$ is $CH_2CH_2OH$ Thickness of the film: 80 μm Thickness of the layer K: 78 μm Thickness of the top layers D: 1 μm One top layer was corona-treated with 41 mN/m. The film has the properties according to the invention mentioned in the table which follows.

EXAMPLE 2

A three-layer film was produced in accordance with EXAMPLE 1, but one of the two top layers D contained no $CaCO_3$.

EXAMPLE 3

A three-layer film was produced in accordance with EXAMPLE 1, but one of the two top layers D contained no antistatic agent and no $CaCO_3$.

EXAMPLE 4

A three-layer film was produced in accordance with EXAMPLE 1, but instead of the amine of the formula I according to Example 1, an N,N-bis(hydroxyethyl)oleylamine was employed in the top layer in an amount of 0.5% by weight.

COMPARISON EXAMPLE 1

A three-layer film was produced in accordance with Example 1, but instead of an amine of the formula I according to Example 1, a non-hydrogenated N,N-bis(hydroxyethyl)alkylamine was employed in the top layer, with partially unsaturated alkyl radicals having 12 to 18 carbon atoms (®Armostat 300).

COMPARISON EXAMPLE 2

A three-layer film was produced in accordance with Example 1, but the two top layers contained no amine.

COMPARISON EXAMPLE 3

A three-layer film was produced in accordance with Example 1, but the two top layers contained no $CaCO_3$.

The following measurement methods were used to characterize the raw materials and the films. The results are shown in the table which follows:
Melt Flow Index (MFI)
  DIN 53 735 under a load of 21.6 N at 230° C.
Melting Point DSC measurement, maximum of the melting curve, heating-up rate 20° C./min.

Gloss

The gloss was determined in accordance with DIN 67 530. The reflector value was measured as the optical parameter for the surface of a film. In accordance with standards ASTM-D 523-78 and ISO 2813, the incident angle was set at 60° or 20°. A light ray impinges on the flat test surface under the incident angle set and is reflected or scattered by this. The light rays which fall on the photoelectronic receiver are displayed as a proportional electrical parameter. The measurement value is dimensionless and must be stated together with the incident angle.

Surface Tension

The surface tension was determined by means of the so-called ink method (DIN 53 364).

Printability

The corona-treated films were printed 14 days after their production (short-term evaluation) and 6 months after their production (long-term evaluation). The adhesion of the ink was evaluated by means of the adhesive tape test. If no ink could be detached by means of adhesive tape, the adhesion of the ink was evaluated as moderate, and if significant ink was detached, it was evaluated as poor.

Opacity and Whiteness

The opacity and whiteness are determined with the aid of the "ELREPHO" electrical reflectance photometer from Zeiss, Oberkochem (DE), standard light type C, 2° normal observer. The opacity is determined in accordance with DIN 53 146. The whiteness is defined as WG=RY+3RZ−3RX.

WG =whiteness; RY, RZ, RX=corresponding reflection factors using the Y, Z and X color measurement filter. A pressed pallet of barium sulfate (DIN 5033, part 9) is used as the white standard. A film sample (size DIN 4) is irradiated in a device of the Suntest CPS type from Heraeus, Hanau (DE) for several days, irradiation intensity 765 W/m$^2$, and then compared with a non-irradiated sample with the naked eye.

Chalking 8,000 m of film are cut at 400 m/min on a Monoslit roller cutter from Goebel. The air on the cutting blade is sucked off and passed through a filter. The increase in weight of the filter is determined.

Destacking Properties

Cut sheets of 700×1,000 mm are taken in and printed on an offset printing machine from Heidelberger (cycle rate 60 sheets/min). The number of take-off defects per 100 sheets is taken as a measure of the de-stacking properties.

Surface Resistance

The surface resistance was measured in accordance with DIN/draft 57 303 part 14 and stated in ohm.

Sealed Seam Strength

For the determination, two film strips 15 mm wide were placed on top of one another and sealed at 130° C., over a sealing time of 0.5 sec under a sealing pressure of 10 N/mm$^2$ (apparatus: Brugger type NDS, sealing jaws heated on one side). The sealed seam strength was determined by the T-peel method and stated in N.

Roughness

The roughness was determined in accordance with DIN 4768.

| Examples | Destacking Properties | Surface Resistance | Chalking | Sealability |
| --- | --- | --- | --- | --- |
| Example 1 | <1 | $4.5 \cdot 10^{10}$ | 0.3 | 1.6 |
| Example 2 | 2–3 | $5 \cdot 10^{10}$ | 0.4 | 1.6 |
| Example 3 | 2–3 | $1 \cdot 10^{11}$ | 0.3 | 1.6 |
| Example 4 | <1 | $5 \cdot 10^{10}$ | 0.3 | 1.6 |

-continued

| Examples | Destacking Properties | Surface Resistance | Chalking | Sealability |
| --- | --- | --- | --- | --- |
| Comparative Example 1 | 7–10 | $2 \cdot 10^{13}$ | 0.4 | 1.6 |
| Comparative Example 2 | 7–10 | $1 \cdot 10^{15}$ | 0.3 | 1.6 |
| Comparative Example 3 | >50 i.e. not destackable | $1.5 \cdot 10^{11}$ | 0.4 | 1.6 |

What is claimed is:

1. A sealable, coextruded, biaxially orientated opaque film comprising a base layer which comprises a propylene polymer and filler, and at least one sealable top layer comprising an olefinic polymer, wherein the top layer comprises 4–8% by weight based on the weight of the top layer of inorganic and/or organic particles incompatible with the olefinic polymers of the top layer, and tertiary aliphatic amine of the formula I $$R^1-N\diagdown_{R^3}^{R^2} \quad (I)$$

in which

R$^1$ is a saturated alkyl radical having 8 to 26 carbon atoms and

R$^2$ and R$^3$ are identical or different and are R$^4$-CH$_2$OH, in which R$^4$ is a saturated C$^1$–C$^6$-alkylene radical.

2. A sealable film as claimed in claim 1, wherein the base layer comprises polypropylene having a degradation factor A of from 3 to 15.

3. A sealable film as claimed in claim 1, wherein the top layer comprises an olefinic copolymer having a degradation factor A of from 3 to 15.

4. A sealable film as claimed in claim 1, wherein R$^1$ is a C12–C18 saturated alkyl radical and R$^4$ is a saturated C1 alkylene radical.

5. A sealable film as claimed in claim 1, wherein the top layer comprises 2 to 8% by weight based on the weight of the top layer of calcium carbonate.

6. A sealable film as claimed in claim 1, which comprises a top layer on either side of the base layer, wherein each of the top layers have a thickness of from 0.7 to 5 μm.

7. A sealable film as claimed in claim 1, wherein R$^1$ is a C12–C18 saturated alkyl radical and R$^4$ is a saturated C1 alkylene radical, wherein the top layer comprises 0.05 to 2% by weight of said amine and 2 to 8% by weight of calcium carbonate, each based on the weight of the top layer.

8. A sealable film as claimed in claim 1, wherein the film has a density of <0.7 g/cm$^3$.

9. A sealable film as claimed in claim 1, wherein the film comprises 5 to 25% by weight, based on the total weight of the film, of inorganic and/or organic particles and fillers.

10. A sealable film as claimed in claim 1, wherein the base layer of the film comprises 3 to 20% by weight, based on the total weight of the film, of fillers.

11. A sealable film as claimed in claim 1, wherein the top layer comprises 4 to 8% by weight, based on the weight of the top layer, of inorganic particles.

12. A sealable film as claimed in claim 1, wherein the inorganic and/or organic particles have an average particle size of 1 to 6 μm.

13. A sealable film as claimed in claim 1, wherein the filler of the base layer comprises $CaCO_3$.

14. A sealable film as claimed in claim 13, wherein the base layer comprises 10 to 15% by weight, based on the total weight of the film, of $CaCO_3$.

15. A sealable film as claimed in claim 1, wherein the top layer comprises 0.05 to 2% by weight based on the weight of the top layer of tertiary aliphatic amine of the formula I.

16. A sealable film as claimed in claim 1, wherein the top layer comprises inorganic particles having a particle size of 1 to 6 μm.

17. A sealable film as claimed in claim 1, wherein the top layer comprises $CaCO_3$.

18. A sealable film as claimed in claim 1, wherein the filler of the base layer comprises the same compound as the particles of the top layer.

19. A sealable film as claimed in claim 1, wherein the thickness of the top layer is 0.5 to 5 μm.

20. A sealable film as claimed in claim 1, which comprises said top layer on each side of the base layer, where the top layers are the same or different.

* * * * *